Oct. 24 1933.     J. F. KITCHEN     1,931,729
MEANS TO FACILITATE THE DISTRIBUTION OF
FUEL IN INTERNAL COMBUSTION ENGINES
Filed Jan. 28, 1928     3 Sheets-Sheet 1
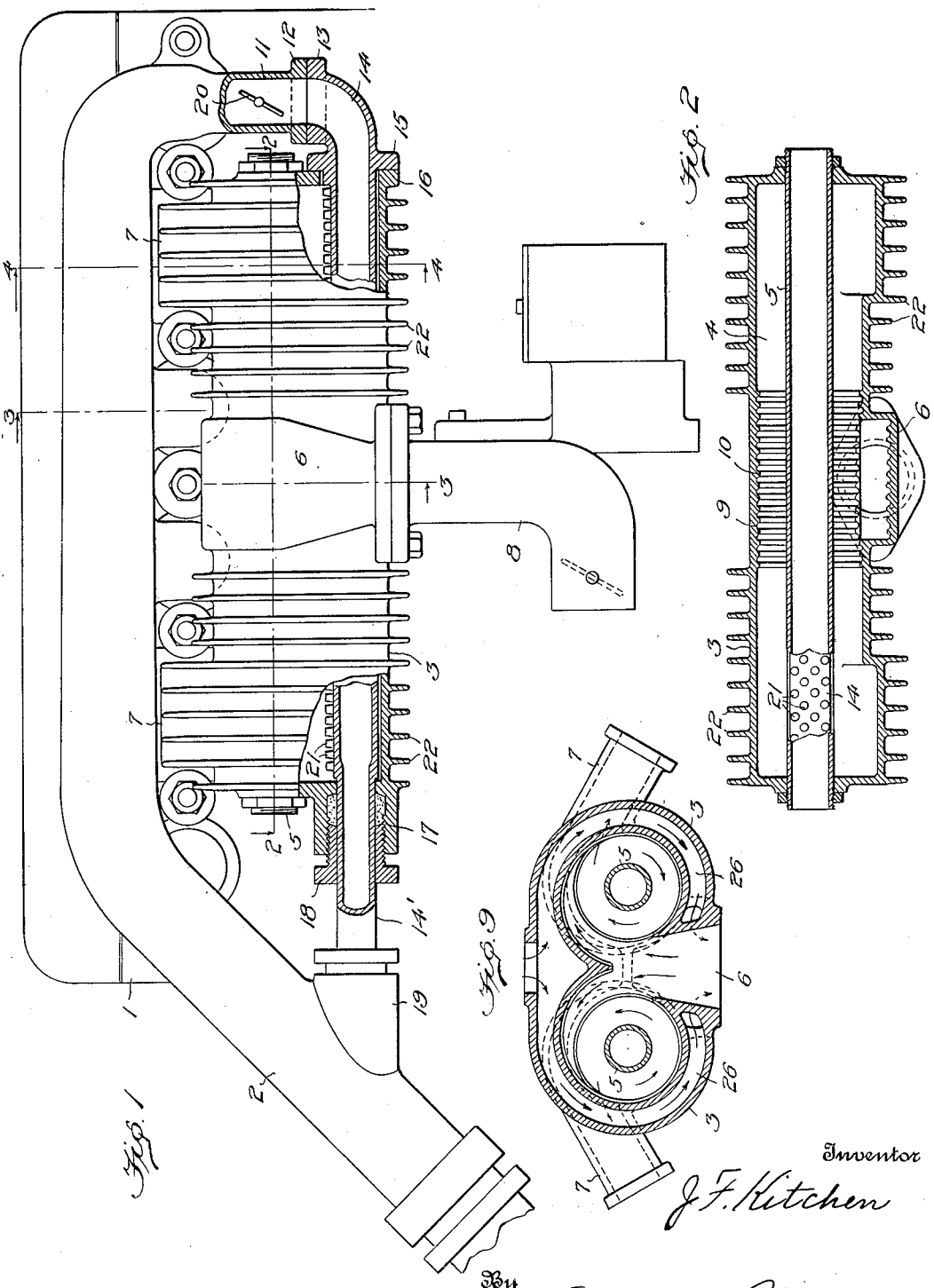

Oct. 24, 1933. J. F. KITCHEN 1,931,729
MEANS TO FACILITATE THE DISTRIBUTION OF
FUEL IN INTERNAL COMBUSTION ENGINES
Filed Jan. 28, 1928 3 Sheets-Sheet 2
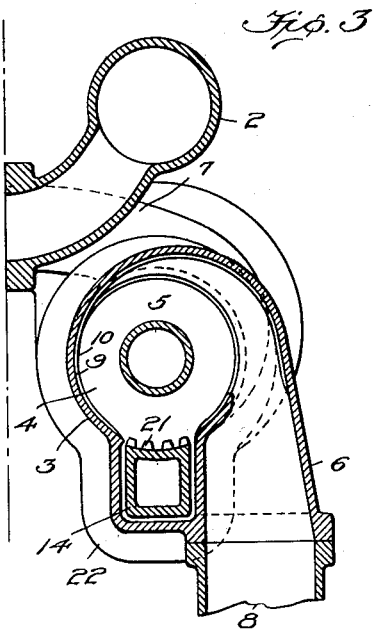
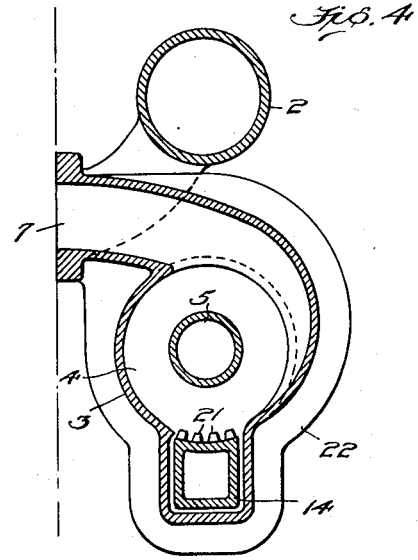
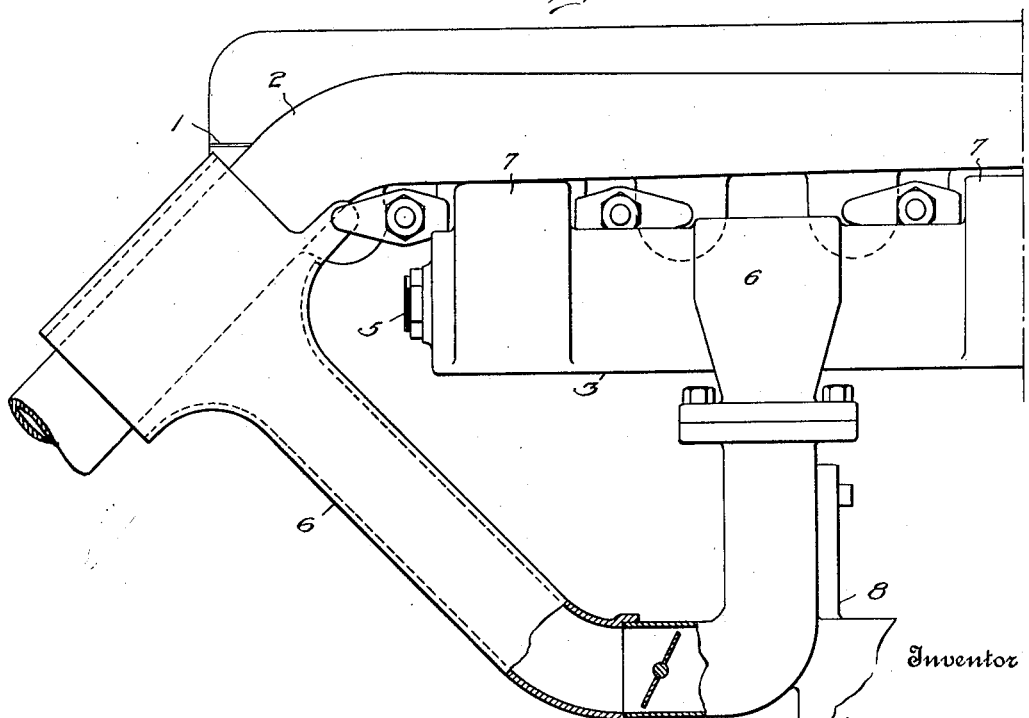

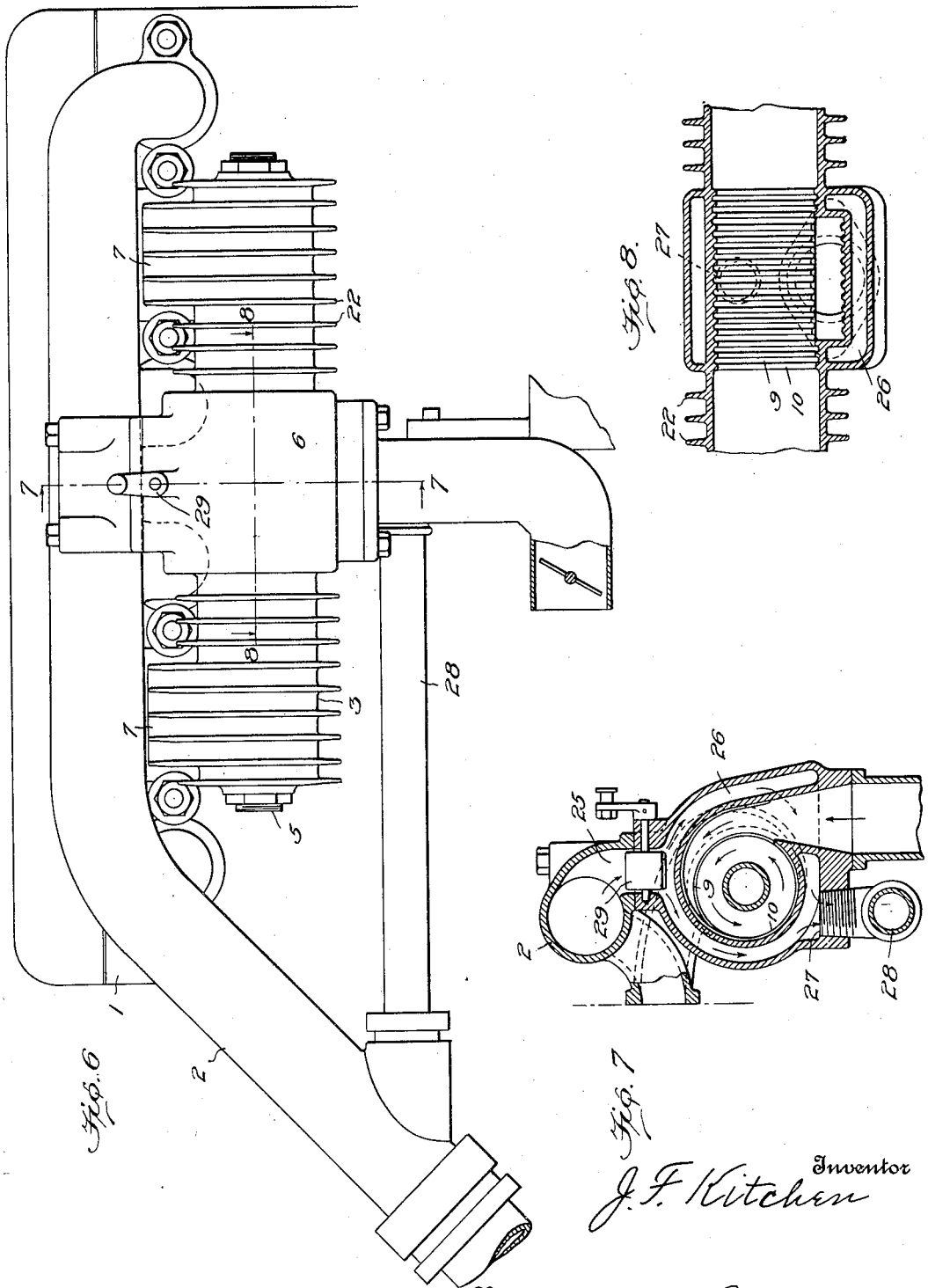

Patented Oct. 24, 1933

1,931,729

UNITED STATES PATENT OFFICE 1,931,729

MEANS TO FACILITATE THE DISTRIBUTION OF FUEL IN INTERNAL COMBUSTION ENGINES

John F. Kitchen, Erie, Pa.

Application January 28, 1928. Serial No. 250,233

6 Claims. (Cl. 123—122)

This invention relates to means for conducting and delivering a mixture of air and liquid fuel from a mixing device, to the cylinders of a multi-cylinder internal combustion engine.

The primary object of the invention is to completely vaporize the liquid fuel and to convey the mixture of air and fuel into the cylinders in the same proportion of air and fuel constituent as when such mixture left the mixing chamber or caburetor, and without heating said mixture too far above the temperature necessary to prevent condensation of fuel.

It has been found that a suitable or prime mixture of air and fuel comprises a relatively high percentage of air as for example, ninety-three percent of air to seven percent of gasoline by weight. It has also been found that a comparatively small change in the fuel constituent will destroy the prime mixture required for highest economic efficiency. It is well known that the fuel in such mixtures of air and fuel constituents, does not at all times become adequately vaporized. This is especially true in the first starting of an engine, and under certain conditions of load and speed. Under these conditions, particles of liquid fuel are carried in suspension after the mixture has left the carburetor, and are thrown in contact with the inner walls of the usual form of intake manifold now in use, where through attraction, they adhere and accumulate, until dislodged by a higher frequency of suction pulsations of the engine. When this occurs, the dislodged un-aerated fuel commingles with and enriches the incoming prime mixture from the carburetor, and introduces a mixture into the cylinders that is variable in fuel content, sluggish in combustion, and causes uneven running of the engine, as well as carbon deposits in the cylinders.

To overcome these difficulties, various means have been employed to aid in the complete vaporization of the liquid fuel. The most common forms of such means now in use contemplate the employment of hot jackets or hot spots on the body of the inlet manifold and various means for pre-heating the air before it is drawn into the carburetor. These are successful to a certain degree, above which they cause a loss in volumetric efficiency by overheating and unnecessarily expanding incoming mixture.

It is well known in the art, that by maintaining a relatively low temperature in the completely vaporized mixture, results in better performance on the part of an engine.

It will be obvious to those skilled in the art, that by the improved form of intake manifold herein described, that means are provided for the complete vaporizing of the fuel carried in suspension from the carburetor into the manifold, as well as means for regulating and correcting the temperature of the mixture on its way to the cylinders.

Other objects of the invention will become apparent as the description proceeds.

In the accompanying drawings, forming a part of these specifications, I have illustrated the embodiments of my invention, showing the structure and the functions of the manifold and by the use of which the practice of my improved method will be produced.

In the drawings:—

Fig. 1 is a longitudinal view partly in section, of one form of my improved manifold.

Fig. 2 is a longitudinal sectional view taken on the lines 2—2 of Fig. 1.

Fig. 3 is a vertical sectional view taken on the line 3—3 of Fig. 1.

Fig. 4 is a vertical sectional view taken on the line 4—4 of Fig. 1.

Fig. 5 is a side elevation showing the carburetor attachment and air heating means leading thereto.

Fig. 6 is a side elevation showing a modification of the apparatus.

Fig. 7 is a vertical sectional view taken on the line 7—7 of Fig. 6.

Fig. 8 is a longitudinal sectional view taken on the line 8—8 of Fig. 6.

Fig. 9 is a vertical sectional view showing a modification of the apparatus adaptable to a multiple cylinder engine of the V type of assembly.

Referring to the drawings, wherein like reference numerals designate corresponding parts throughout the several views; 1 is the engine cylinder block, to which is suitably attached the exhaust conduit 2. Positioned below the exhaust conduit 2 is the intake manifold 3, which forms the important feature of this invention.

Positioned within the intake manifold 3 is a hollow core tube 5, forming an annular space within the manifold 3. Formed intermediate of the ends of the manifold 3, is the intake duct 6 which connects tangentially or approximately so with the annular space 4.

Positioned in the manifold 3, and spaced apart from the inlet duct 6, are the cylinder inlet ducts 7, which have direct communication with the annular space 4.

Attached to the inlet duct 6, may be positioned any of the common forms of carburetors now on the market. Attached to the inlet of the carburetor may be the hot air conduit 6' a form of heating means well known in the art.

In the movement of the suction stroke of the engine piston, a mixture of vaporized fuel is caused to flow from the carburetor 8 into the intake manifold space 4, through the intake duct 6. The formation of the intake duct 6 is of novel construction and is adapted to cause the incoming mixture to describe an annular movement following a helical path from the intake duct 6, around the core 5, until it reaches the cylinder ducts 7.

The resulting effect of the above described movement of the ingoing mixture, forms one of the important features of this invention.

Positioned within the annular space 4, in the intake manifold, and in the zone of initial contact therewith, of the incoming mixture of fuel, is a series of alternate grooves 9 and ridges 10, (see Fig. 2) the purpose of which will be more fully explained.

It being well known in the art, that the vaporizing of any liquid causes a decrease in temperature, and in vaporizing an engine fuel, it is essential that the required vaporizing temperature be retained in the mixture until it has reached the interior of the cylinders. The degree of required temperature, and its subsequent control, form important functions in the maintenance of the highest efficiency of internal combustion engines. I have provided novel means for carrying out these functions. For the purpose of providing the required heat, in the case of the manifold shown in Fig. 1, I provide for by-passing a controlled portion of the exhaust gases through a conduit passing through the interior of the manifold 3.

For the purpose of providing the required cooling means where this is necessary I provide for passing a column of atmospheric air through the interior of the core tube 5, and this passage of air therethrough may be accelerated by the usual belt driven fan (not shown).

The production of the heating means is provided for by forming on the exhaust conduit 2, of an auxiliary duct 11, having a suitable flange terminal 12, to which is detachably connected the flanged terminal 13 of the exhaust by-pass conduit 14. The conduit 14 is suitably positioned within a pocket 14' formed in the lower wall of the manifold 3, with sufficient clearance with the side wall of the pocket 14' to obviate undue heating of the manifold wall contiguous to the conduit 14. The outer end of the conduit 14 is formed with a closure contact flange 15 adapted to form a suitable closure with the contiguous outer face 16 of the correspondingly apertured part of the manifold 3, by means well known in the art. The opposite outer end of the conduit 14, is positioned within the packing box 17, into which is screw threaded or otherwise held the packing compressing nut 18, a form of closure well known in the art. The discharge end of the conduit 14 is suitably attached, to discharge its contents into the exhaust discharge conduit 2, by a suitable packing nut threaded or otherwise held on the boss 19. For the purpose of controlling the flow of exhaust gases through the by-pass conduit 14, there is provided the vane valve 20.

Positioned on the upper surface of the by-pass conduit 14, and normally extending into the zone of the periphery of the annular space within the manifold 3, are projecting studs 21 adapted to increase the surface area of the lower wall of the manifold interior, and to catch and impede the progress of the unvaporized fuel until it is vaporized by the heat of by-pass conduit 14.

Positioned on the exterior of the manifold 3, are the projecting annular flanges 22, adapted to give increased surface radiation to the manifold exterior. By such radiation into the surrounding atmospheric air the shell of the manifold is maintained as nearly as possible at the proper temperature.

Positioned on the exterior wall of the by-pass conduit 14, are the projecting studs 21. These studs are arranged in staggered formation and project into the outer position of the annular space 4, where they trap, impede the progress of, and vaporize by heat, any unvaporized fuel which is being carried around by the rotating current.

In Fig. 6 is shown a modification of the means designed to accomplish the purposes to which the invention is directed. In the apparatus shown in Fig. 6, the exhaust conduit 2, has a discharge duct 25, located centrally thereof and in contiguous relation to the intake duct 6. Positioned on the exterior of the intake duct 6, and circumscribing the major portion thereof, is the exhaust chamber 26, into which the exhaust emanating from the discharge duct 25 enters and circulates around the annular shell of the manifold 3, and the inlet duct 6, before passing out through the discharge duct 27, into the exhaust conduit 28. Positioned within the intake duct 25, is a vane valve 29 adapted to regulate the amount of exhaust gases that may be desired to by-pass through the exhaust chamber 26, for the purposes of creating the required heat for the proper functioning of the apparatus.

It will be obvious to those skilled in the art that, with my improved form of intake manifold there will be practically continuous rotary movement of mixture through the whole length of the annular space in the manifold and that wherever an inlet valve opens, a current of mixture thereto can be promptly established without the necessity of overcoming the inertia of stationary columns or adverse currents of mixture in the body of the manifold.

It will also be obvious that where there is a difference in the length and shape of inlet passages leading to one cylinder or group of cylinders as compared to another, the distribution of mixture can be made practically uniform by locating the duct 6, near to the passage most difficult to feed.

By the novel formation of the inner walls of the intake duct 6, comprising the grooves 9, and the ridges 10, any unvaporized fuel constituents, or any solid fuel which is carried in suspension in the center column of current from the carburetor, will be trapped by the grooves 9, near the centre line of the inlet, and particles of such solid fuel will be carried by the movement of the current through the annular path until it reaches the juncture point between the directly incoming current from the carburetor, and the annular directed current which has made its cycle of movement in the annular path, where it is projected between the two currents and is there subjected to the breaking up process by the turbulence due to the difference in the incoming current and the retarded annularly directed current. At this stage the centrifugal effect projects any remaining liquid fuel outwardly from the centre of the column of flow, against the grooved surface of the central portion of the manifold, to follow another cycle of movement in an annular path until such unvaporized fuel is sufficiently aerated to be subjugated to the change of direction to follow a helical path of flow to the inlet valves of the engine. Any remaining particles of liquid fuel that may have passed the zone of turbulence, or still adhering to the grooved formation of the central portion of the manifold, will be constantly subjected to the scrubbing and aerating effect of the concentrically moving current.

By the means described, I have produced a resulting effect of centrifugal action within the movement of the flow of the fuel mixture which refines the charge entering the cylinders of any unvaporized portion or particles of liquid fuel, and further conducts such particles of unvaporized fuel to a more efficient vaporizing zone.

A further development in the use of my invention is the creation within the manifold of concentric zones having different speeds of movement and different temperatures in each respective concentric zone. The current flowing in the helical path will have less velocity in the inner concentric zone than the current flowing in the outer concentric zone, and that flowing in the inner zone will form contact with the air cooled central core 5 while the current in the outer concentric zone will form contact with the exhaust heated hot spot 21.

By this novel arrangement the partially vaporized mixture is directed to a heating zone and the vaporized mixture is directed to a cooling zone conjointly, while both are moving in a path of travel common to each. I have therefore produced by my invention, a means whereby the fuel mixture upon leaving the carburetor, is directed to, and is passed through either a heating zone, or a cooling zone, according to the degree of its state of partial or complete vaporization, while enroute through the manifold to the cylinders.

As the fuel mixture leaves the outlet ducts of the manifold at the engine block valve openings, the mixture portion traveling in the outer concentric zone, will be projected across the mixture portion traveling in the inner concentric zone, thus forming a complete commingling of the mixture from both zones before its entry into the cylinders.

This form of manifold is especially favorable to the use of supplemental air openings or "air bleeds" into the ingoing mixture, which can be located either in the body of the manifold, or in the central core. This form of manifold is applicable to the V type of cylinder positioning as is indicated in Fig. 9, as well as the "straight" or "line type" of cylinder placings.

It will be readily understood that changes in size, form and construction of the various parts of my improved apparatus can be made without departing from the spirit of my invention. In this respect I desire not to be limited in the proportionate size of the annular space shown, and to reserve the right to make changes therein by reducing the depth of the annular space and thereby increase the speed of the current therethrough, as speed of flow has a direct effect on the promptness with which solid fuel will be projected against the walls of the intake interior; and the scrubbing effect of the currents upon the fuel trapped in the walls, due to increased radial pressure and speed. The speed of flow of the mixture, regulates the time of contact of the moving mixture with the manifold, and the duration of the exposure of the mixture to the heating means. By a proper corelation of speed and heating means the mixture can be delivered fully vaporized without overheating.

What I do claim and desire to secure by United States Letters Patent is:

1. In an intake manifold for internal combustion engines, a distributing chamber having a single inlet conduit and a plurality of outlet conduits, with an open ended hollow core extending longitudinally through said distributing chamber, adapted for the passage of atmospheric air therethrough.

2. An inlet manifold comprising a distributing chamber having a plurality of outlet ducts and a single inlet duct leading to a header, a cylindrical core extending transversely through said header adapted for passage of atmospheric air therethrough, and a wall in said inlet duct header fashioned and situated relative to said cylinder core so that entering mixture may be influenced to describe a helical path around said core in its movement to the outlet ducts.

3. An inlet manifold comprising a distributing chamber having a plurality of outlet conduits, and a single inlet conduit leading to a header, an open ended cylindrical core extending transversely through said header and a wall in said header opposite to said inlet duct fashioned and situated relative to said cylindrical core so that entering mixtures may be influenced to describe a helical path around said core in its movement to the outlet conduits and a heating means comprising a jacket partially surrounding said distributing chamber.

4. In an inlet manifold, a distributing chamber having a plurality of outlets and a single inlet leading to a header, a cylindrical core extending transversely through said header adapted for the passage of atmospheric air therethrough, a wall in said header opposite said inlet fashioned and positioned relative to said core so that entering mixtures may be influenced to describe a helical path to said outlets, and heating means located within said distributing chamber and extending into the periphery of the helical path of said mixture.

5. An intake manifold for engines comprising a tubular member having an inlet port and a plurality of exit ports adapted to communicate with the inlet valves of an engine, a cylindrical core extending transversely through said tubular member adapted for the passage of air therethrough, a conduit extending longitudinally through said tubular member having communication with the exhaust valves of said engine, and a fuel mixing device attached to said tubular member.

6. An intake manifold for internal combustion engines, comprising a tubular member having an inlet port and a plurality of exit ports adapted to communicate with the intake valves of said engine, a conduit extending longitudinally through said tubular member having communication with the exhaust valves of said engine, a second conduit extending longitudinally through said tubular member having open ended communication with the atmosphere, and a fuel mixing device attached to said tubular member inlet port.

JOHN F. KITCHEN.